United States Patent [19]

Farquhar et al.

[11] 4,057,034

[45] Nov. 8, 1977

[54] PROCESS FLUID COOLING SYSTEM

[75] Inventors: Norman G. Farquhar, Clairton; John A. Schwab, Scottdale, both of Pa.

[73] Assignee: Westinghouse Electric Corporation, Pittsburgh, Pa.

[21] Appl. No.: 577,955

[22] Filed: May 15, 1975

[51] Int. Cl.² .......................................... F22B 37/54
[52] U.S. Cl. .................................. 122/382; 60/644; 165/144; 176/38
[58] Field of Search ...................... 60/644; 176/37, 38; 122/382; 165/143, 144

[56] References Cited

U.S. PATENT DOCUMENTS

| | | | |
|---|---|---|---|
| 1,543,727 | 6/1925 | Sargent | 122/382 |
| 1,812,050 | 6/1931 | Kensig | 122/382 |
| 1,895,635 | 1/1933 | McDonald | 122/382 |
| 1,913,195 | 6/1933 | Donaldson | 122/382 |
| 2,825,314 | 3/1958 | Engel | 122/382 |
| 3,607,636 | 9/1971 | Nageler | 60/644 |
| 3,976,541 | 8/1976 | Stiteler | 176/38 |

Primary Examiner—C. J. Husar
Assistant Examiner—Daniel J. O'Connor
Attorney, Agent, or Firm—Edward L. Levine; Z. L. Dermer

[57] ABSTRACT

A system of heat exchangers for cooling process fluids. The system is particularly applicable to cooling steam generator blowdown fluid in a nuclear plant prior to chemical purification of the fluid in which it minimizes the potential of boiling of the plant cooling water which cools the blowdown fluid.

5 Claims, 4 Drawing Figures

PROCESS FLUID COOLING SYSTEM

BACKGROUND OF THE INVENTION

1. Field of the Invention

This invention relates to a system for cooling process fluids, where localized or bulk overheating of the cooling fluid is undesirable. It is particularly applicable to the steam generator blowdown fluid in a nuclear plant.

2. Description of the Prior Art

In nuclear reactor plants incorporating a steam generator which serves to transfer heat from the reactor primary system to the secondary steam system, a method for purification of the steam system water is typically employed. This method may include purification of at least a portion of the feedwater stream prior to entry into the steam generator. Also typically incorporated is a blowdown system which serves to remote any undesirable chemical buildup of impurities within the steam generator. Such blowdown systems may operate either continuously or intermittently and typically remove water from the lower portion of the steam cycle side of the steam generator. The lower portion of the steam cycle side of the steam generator are the most likely locations for solid precipitation buildup.

As the blowdown fluid removed is at a significantly high temperature and pressure condition, it must be cooled before such means as ion exchange demineralization may be utilized for purification of the blowdown fluid. Initial nuclear plant designs utilized a system whereby the high temperature, high pressure, blowdown fluid was directed to a flash tank. These systems thereby avoided the use of any heat exchangers to cool the blowdown fluid or did provide a heat exchanger primarily to preheat boiler feedwater while cooling the blowdown water. With the boiler feedwater at high pressures and with carefully controlled water chemistry, corrosive conditions typical of ordinary service water cooling were avoided. The flash tank type system has the drawback that approximately one-third of the blowdown fluid flashes to steam, and is discharged. Not only does this require makeup of that amount of water, but also any entrained volatile gases, such as iodine, are released to the atmosphere. With increased regulatory requirements as to redundant means of protection against radioactive releases, and with regard to chemical and thermal discharges, the flash tank type systems no longer prove adequate.

Newer systems therefore were designed which basically comprise feeding the blowdown fluid through a single heat exchanger, and removing heat from the blowdown fluid by the plant cooling water (service water or component cooling water). However, design and operating considerations arise with the single heat exchanger designs of the type presently used. The blowdown fluid is at very high pressure and temperature conditions relative to the plant service water. The blowdown fluid typically is at a pressure of between 800 to 1200 psia, depending upon steam generator operating conditions, and at saturated temperature at the given operating pressure. On the other hand, the plant service water, at least for design purposes, is at a temperature in the range of 95° F, and at a pressure in the range of 40 psig. As is evident, these conditions may cause significant operating restrictions on a single heat exchanger.

For example, the typical allowable temperature rise for cooling water is approximately 20° F. This compares with a required temperature drop in the blowdown fluid on the order of 400° F. Roughly, the result is that the cooling flow rate must be approximately 20 times the blowdown fluid flow rate. Severe restrictions are therefore placed on the heat exchanger surface arrangement in order to provide optimum velocities, heat transfer coefficients, and heat transfer surface temperatures, among others. Also, as the inlet service cooling water temperature will be approximately 95° compared to an inlet blowdown fluid temperature between 500° and 600° F, coupled with the large unbalanced mass flow rate, an extensive and costly engineering analysis to evaluate the effect of thermal transients on heat exchanger design and mechanical integrity is required. Further, the temperature relationships result in a condition at the hot end of the heat exchanger in which the bulk water temperature on the blowdown side is on the order of 550° F and on the cooling water side about 120° F. This condition can result in a heat transfer surface temperature high enough on the cooling water side to cause localized boiling. If boiling occurs, there likely will be concentration and precipitation of undesirable chemical solids on the heat transfer surface, a condition which fosters rapid corrosion and tube failure. Under such conditions it would not be unlikely to expect only a few months operation of the heat exchanger before significant failures would occur. The most obvious solution to the boiling problem would be to raise the cooling water pressure to prevent boiling. However, in order to insure that boiling would not occur, a relatively high pressure, on the order of 150 psig, would be required. Such pressures are not normally available from the cooling water pumps, which must operate on a very large volumetric fluid flow rate. Although a booster pump for the cooling water could be incorporated specifically to increase the pressure, such pumps would increase plant costs, and would necessitate detailed system analysis for each plant design. The affects associated with the flow rates, pressure conditions, and temperature differentials are also concerns in other nuclear and non-nuclear systems for cooling process fluids.

The ideal solution to these concerns would be a system utilizing static components and existing cooling water system apparatus.

SUMMARY OF THE INVENTION

This invention provides such a system by utilizing heat exchangers and a specified flow path to cool the hot process fluid. In the main embodiment, the system comprises an initial regenerative heat exchanger, which heat exchanger transfers heat energy from the blowdown fluid from the steam generator to the same stream of fluid subsequent to passing the fluid through a second heat exchanger. The second heat exchanger contains three flow paths. One of the flow paths is for the plant cooling water which removes heat energy from the other two flow paths. Another flow path passes the blowdown stream from the exit of the regenerative heat exchanger through this flow path such that heat is removed by the plant cooling water. The blowdown stream then passes to the second flow path of the regenerative heat exchanger. The final flow path in the second heat exchanger passes this regenerated blowdown stream such that it also has heat energy removed by the cooling water flow. The result is a blowdown fluid stream at temperature and pressure conditions consistent with purification techniques as necessary for the feedwater. A second embodiment comprises splitting the second heat exchanger into two separate heat exchangers each of which pass the plant cooling water through one flow path and one of which passes the first flow stream that is described above, the other of which passes the second flow stream as described above.

By utilizing regenerative heat exchange means and a specified flow path, this invention minimizes the possibility of local boiling in the cooling water flow path, thereby minimizing the potential for mineral buildup. It also minimizes concerns over thermal shock at the inlet of the prior art type single heat exchanger systems, and utilizes existing cooling water equipment and parameters thereby minimizing capital investment.

BRIEF DESCRIPTION OF THE DRAWINGS

The functions and advantages of this invention will become more apparent from the following description in connection with the accompanying drawings, in which.

DESCRIPTION OF THE PREFERRED EMBODIMENTS

Figure 1:
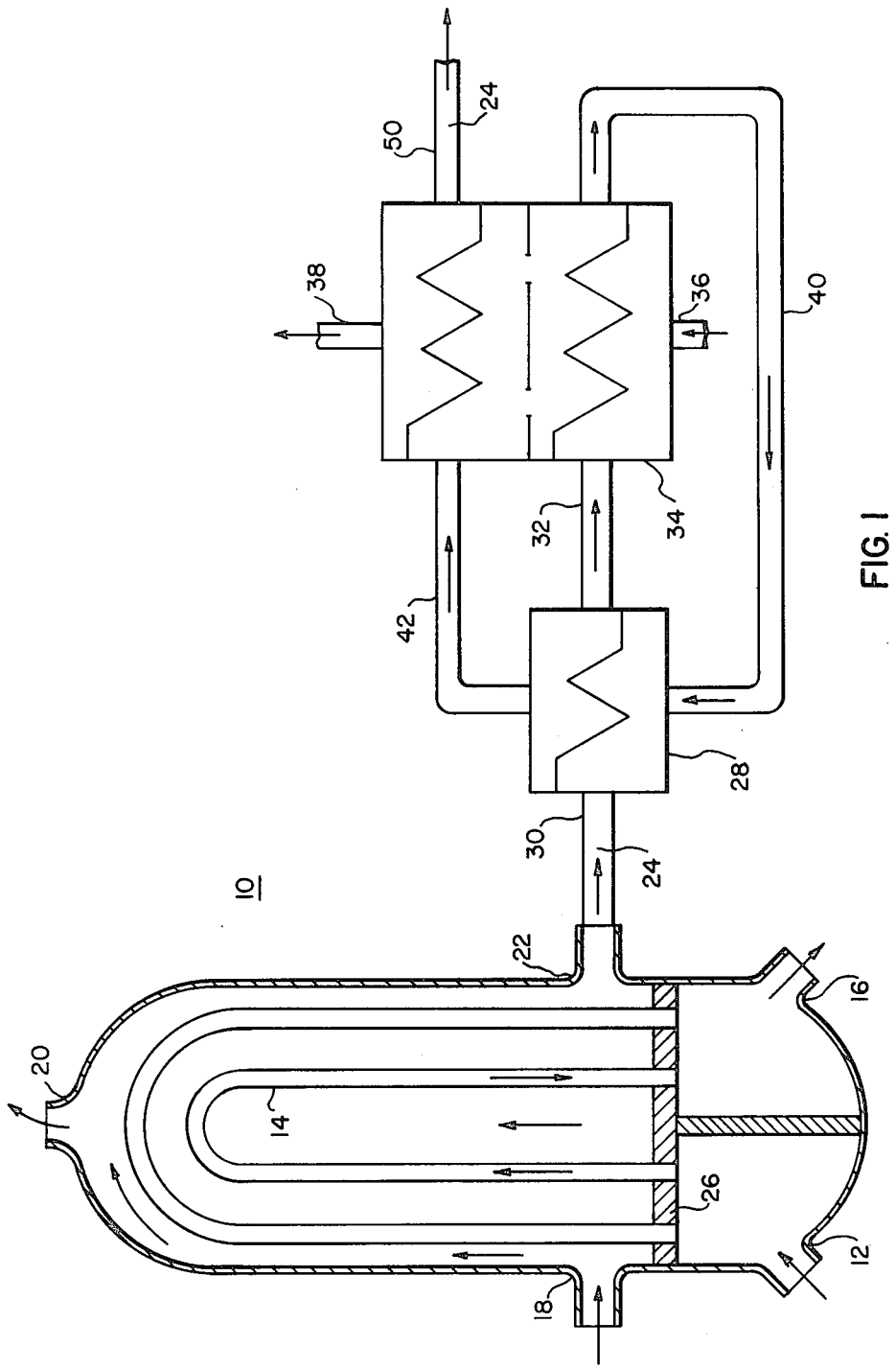
FIG. 1 is a simplified schematic of a typical nuclear steam generator and the heat exchangers of one embodiment system herein disclosed.

This invention provides heat exchange means for cooling process fluids, particularly applicable to cooling steam generator blowdown fluid in a nuclear reactor plant. FIG. 1 illustrates a typical U-tube nuclear steam generator 10. Primary system reactor coolant from the reactor core enters the steam generator 10 at the coolant inlet nozzle 12, tranverses the interior of a plurality of coolant flow tubes 14, and exits through the coolant outlet nozzle 16. Feedwater enters the steam generator 10 at the feedwater inlet nozzle 18, and flows upward, picking up heat energy from the reactor coolant, and exits as saturated steam at the steam outlet nozzle 20, to drive the plant turbine-generator system. Also shown is a blowdown outlet nozzle 22, through which the blowdown fluid 24 is removed from the steam generator 10. A plurality of steam generators are typically used in a nuclear plant.

Operating history with nuclear steam generators 10 has shown the necessity for stringent chemical specifications and controls of the feedwater. These stringent controls are necessary to minimize the potential for stress corrosion cracking in the walls of the tubes 14, and other types of tube attack. In particular, it is highly desirable to avoid any particulate buildup in the lower portion of the steam generator at the the sheet 26, which location has been a prime concern from the tube leak standpoint. A mineral buildup is therefore avoided not only by chemical control of the feedwater entering the steam generator 10 but also by continuously or intermittently removing a portion of the fluid on the steam side of the steam generator 10 for chemical processing. Such processing typically includes demineralization. However, as the maximum suggested operating temperature for most demineralizer resins is 140° F, prior to demineralization this blowdown fluid 24 must be cooled.

In a typcal reactor plant, the feedwater enters the steam generator 10 at a temperature of approximately 440° F and a pressure of approximately 1000 psia. It exits the steam generator at saturated conditions, in the range of 1000 psia. Therefore, a blowdown system must be designed for blowdown fluid 24 exiting the steam generator 10 at conditions in the range of 545° F and 1000 psia.

The blowdown fluid 24 has typically been cooled in existing systems by a large heat exchanger, utilizing the plant cooling water (component cooling water or service water) as the cooling fluid. As this cooling fluid is typically at a temperature in the range of 95° F, at least for design purposes, and a pressure in the range of 40 psia, the large temperature differential across the heat exchanger raises concerns over thermal stresses. This temperature differential, coupled with an allowable temperature rise in the cooling water of about 20° F, has necessitated extensive engineering analysis and design effort in order to provide optimum velocities, heat transfer coefficients, heat transfer surface temperatures, and other critical parameters on a blowdown heat exchanger. The prime concern, however, has been eliminating the potential of a temperature on the heat transfer surface high enough to cause local boiling of the cooling water. The effects of local boiling significantly increase the likelihood of heat exchanger failure. Increasing the pressure of the cooling water to minimize boiling is costly in terms of pumping capacity as well as heat exchanger and piping design.

This invention eliminates these concerns, which are also raised in other process systems, by providing a plurality of heat exchangers, and a specific flow path for the blowdown fluid 24 through the heat exchangers. FIG. 1 shows an embodiment with an initial regenerative heat exchanger 28 passing the blowdown fluid 24 through both flow paths. The blowdown fluid 24 initially enters the regenerative heat exchanger 28 through flow piping line 30, passes through a primary flow path, and exits the heat exchanger 28 at a lower temperature into flow piping line 32. The fluid 24 then enters one of three flow paths in a triple flow heat exchanger 34, where it is further cooled by the plant cooling water entering through flow piping line 36 and exiting through line 38. The blowdown fluid then passes through flow piping line 40 and through a secondary flow path in the regenerative heat exchanger 28 where it picks up heat energy from the initial blowdown fluid and rises in temperature. The fluid 24 then passes through flow piping line 42 to a second flow path in the triple flow heat exchanger 34, where it is recooled by the cooling water. The fluid then exits into flow piping line 50 at a temperature consistent with purification apparatus requirements, less than 130° F.

Figure 2:
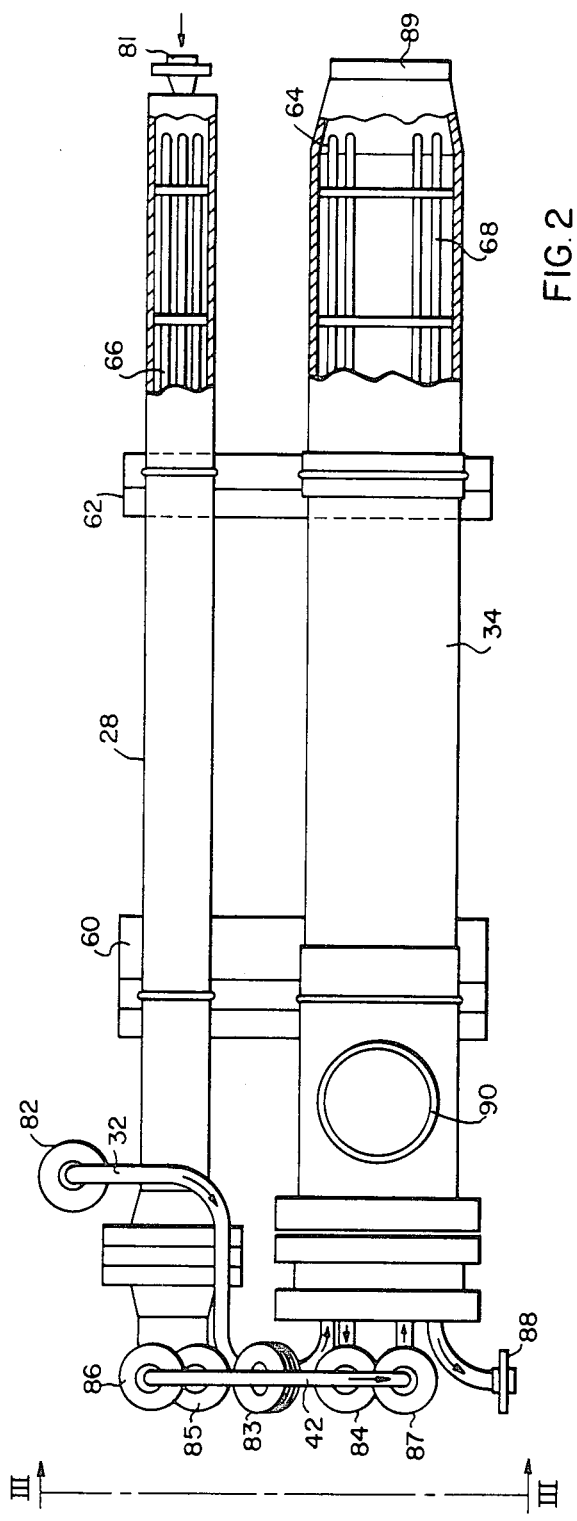
FIG. 2 illustrates two heat exchangers and associated piping mounted on common skids, consistent with the invention disclosed herein.
Figure 3:
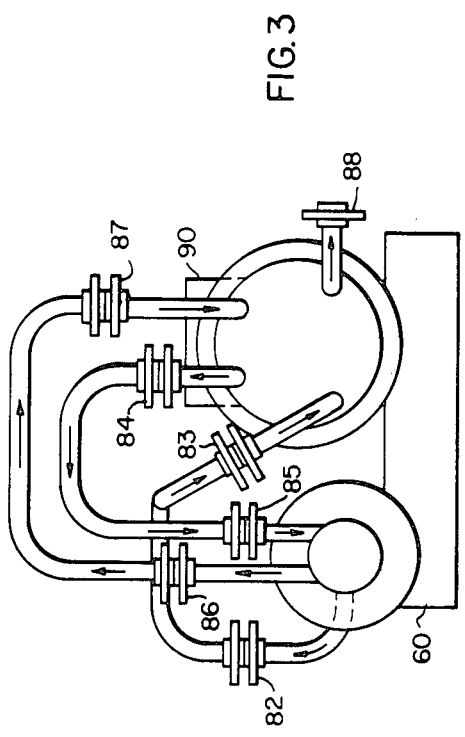
FIG. 3 is an end view taken at III—III of FIG. 2.

The advantages provided by this system will become readily apparent to one skilled in the art when the conditions of the blowdown fluid throughout the system are seen. As mentioned above, the blowdown fluid is initially at a temperature and pressure of approximately 545° F and 1000 psia, while the plant cooling water is at approximately 95° F and 40 psia. Both the regenerative heat exchanger 28 and the triple flow heat exchanger 34 may be of various designs. These types include straight tube and shell, U-tube and shell, helical tube, counter current or parallel current flow, and plate type, among others. Also, the fluid streams passing through the heat exchangers could follow various flow paths, such as tube side or shell side. Further, the triple flow heat exchanger could be replaced by two distinct dual flow heat exchangers. The analysis below is based upon a U-tube and shell type regenerative heat exchanger 28, with the initial stream of blowdown fluid 24 passing across the exterior of the tubes, and the steam from the exit of the triple flow heat exchanger 34 passing through the interior of the tubes. It is further based upon a triple flow heat exchanger 34 in which plant cooling water passes on the shell side, and blowdown fluid passes through the U-tube side flow paths. Additional details of the example apparatus and flow piping is shown in FIGS. 2 and 3, which illustrate the two heat exchangers 28 and 34 on common mounting skids 60 and 62.

The flow path through the heat exchangers is as follows. The blowdown fluid 24 initially enters the regenerative heat exchanger 28 through an inlet nozzle 81, passes along the shell side, and exits at an outlet nozzle 82. It then passes through flow piping line 32 to an inlet nozzle 83, passes through a plurality of U-tubes 64, and exits at an outlet nozzle 84. The blowdown fluid 24 then passes through flow line 40 (not shown) to an inlet nozzle 85, through U-tubes 66, and exits at an outlet nozzle 86. It then passes through flow piping line 42 to an inlet nozzle 87, through U-tubes 68, and exits at an outlet nozzle 88. Plant cooling water enters heat exchanger 34 through a coolant inlet 89, passes along the shell side, and exits at a coolant outlet 90.

To accomplish the prime requirement of minimizing the potential of boiling of the cooling water, the simple example that follows shows that this requirement can be easily met utilizing the disclosed invention:

EXAMPLE

Blowdown fluid enters the system through flow piping line 30 (FIG. 1) at 1000 psia and 545° F. If it is assumed that the regenerative heat exchanger cools the blowdown fluid 24 half way to the desired final temperature (130° F), this results in a temperature in line 32 of, say 350° F, at a pressure of 975 psia.

To ascertain the possibility of boiling of the cooling water in the triple flow heat exchanger 34, assume the heat transfer surface temperature is midway between the bulk temperature of the hot and cold fluids:

$$\frac{350° F + 115° F}{2} = 233° F$$

The saturation pressure at 233° F is 22 psia. Therefore, if the cooling water pressure is kept at or above 22 psia, no boiling will occur.

Based upon the above, Table I presents the condition of the blowdown fluid throughout the cooling system.

TABLE I

| Location | Temp. (° F) | Press. (psia) | Enthalpy (H) (BTU/LB) | Duty (ΔH) (BTU/LB) |
| --- | --- | --- | --- | --- |
| line 30 | 545 | 1000 | 543 | — |
| line 32 | 350 | 975 | 322 | — |
| Δ(line 30 − line 32) | | | | 221 |
| line 40 | 130 | 950 | 98 | — |
| Δ(line 32 − line 40) | | | | 224 |
| line 42 | 348 | 925 | 319 | — |
| Δ(line 40 − line 42) | | | | 221 |
| line 24 | 130 | 900 | 98 | — |
| Δ(line 42 − line 24) | | | | 221 |
| line 36 | 95 | ≧22 | 63 | |
| line 38 | 115 | ≧22 | 83 | |
| Δ(line 38 − line 36) | | | | 20 |

Figure 4:
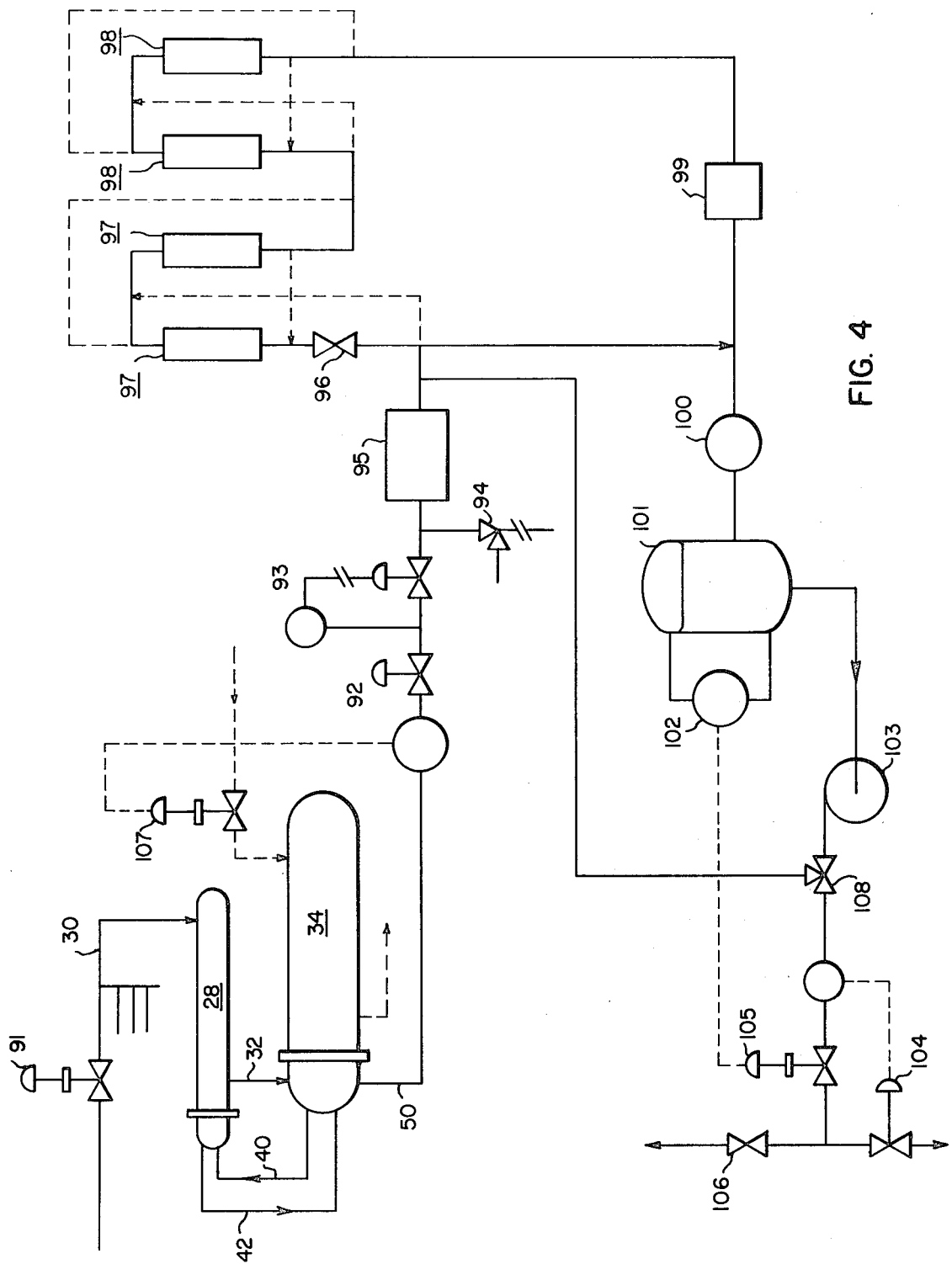
FIG. 4 is a simplified schematic of a complete steam generator blowdown system in accordance with this invention.

As the pressure of plant cooling water is typically in the range of 40 psia, it is evident that this invention minimizes boiling potential. The parameters presented above may be varied somewhat depending upon actual plant requirements, and hence the desired temperature in line 32. The variation, however, will not be major, and will therefore not significantly increase the required cooling water pressure (22 psia). Typical cooling water flow rates are on the order of 1,000,000 lb/hr for a blowdown rate of 75 GPM to achieve a temperature in line 24 of 130° F. This flow rate of cooling water is the prime control variable to insure a temperature below 130° F prior to demineralization. A simplified schematic of a complete blowdown system is shown in FIG. 4, additionally showing some of the primary control elements. Components shown include a flow control valve 91, an isolation valve 92, a pressure control valve 93, a pressure relief valve 94, an inlet filter 95, a bypass valve 96, cation bed demineralizers 97, mixed bed demineralizer 98, an outlet filter 99, a radiation element 100, a surge tank 101, a level controller 102, a pump 103, a second radiation element and valve 104, a level control valve 105, a recycle valve 106 and a temperature control valve and element 107.

During normal operation, the flow of blowdown fluid 24 from each steam generator 10 is individually controlled by flow control valves 91 before the blowdown lines are manifolded into line 30. The blowdown fluid 24 then passes through the heat exchangers 28 and 34 where it is cooled and the pressure reduced, and then the pressure is further reduced by pressure control valve 93 prior to passing through the inlet filter 95. The fluid 24 may then flow directly to the surge tank 101 being monitored by element 100, or diverted through the plurality of series connected cation bed demineralizers 97 and mixed bed demineralizers 98. If flow is through the demineralizers, the fluid then passes through the outlet filter 99 and radiation element 100, into the surge tank 101. Provisions are made for recycle through the demineralizers 97 and 98, when necessary. From the surge tank 101, the fluid 24 is pumped by pump 103 either to the plant discharge through valve 104 or to the condenser/feedwater system through valve 106. It may also be recycled through valve 108 to the demineralizers on a high radiation signal from element 100. The flow from the surge tank 101 is automatically controlled by level control valve 105 and the level controller 102. This flow rate may vary in a typical system from as low as 10 gpm to as high as 200 gpm.

The main control of temperature and pressure through the heat exchangers 28 and 34 is by pressure control valve 93 and temperature control valve 107. Valve 93 maintains a constant pressure differential between the inlet to the heat exchangers (line 30) and the outlet from the heat exchangers (line 50). The back-pressure on the hot blowdown fluid prevents excessive flashing up-stream of the heat exchangers. The pressure differential setpoint of valves 93 and 91 may be manually controlled to establish the flow rate from each steam generator 10. The temperature control valve 107 maintains an essentially constant blowdown fluid 24 temperature at the outlet of the heat exchangers (line 50), by varying the cooling water flow. Isolation valve 92 may be used to isolate the heat exchangers 28 and 34 from the rest of the blowdown system.

As described herein, it is therefore seen that this invention provides an improved means for cooling steam generator blowdown fluid which eliminates the concerns of prior systems as to heat exchanger operating performance and engineering analysis, and specifically minimizes potential for boiling of the cooling fluid. It can also be applied to other process fluid cooling systems where the affects of flow rates, pressure, conditions, and temperature differentials among the fluids raise concerns.

We claim:

1. In a steam generator blowdown processing system of a nuclear plant utilizing plant cooling water, means for cooling blowdown fluid comprising:
   a. a regenerative heat exchanger, said heat exchanger having a primary flow path and a secondary flow path,
   b. a triple flow heat exchanger, said triple flow heat exchanger having a first flow path, a second flow path, and a third flow path, said first flow path and said second flow path being in fluid communication with said primary flow path and said secondary flow path of said regenerative heat exchanger, and
   c. means providing fluid communication between said regenerative heat exchanger and said triple flow heat exchanger so that said blowdown fluid initially passes through one of said flow paths of said regenerative heat exchanger and is cooled, then through one of said first flow path and said second flow path of said triple flow heat exchanger to further cool said blowdown fluid, then through the other of said primary flow path and said secondary flow path of said regenerative heat exchanger to reheat said previously cooled fluid, and then through the other of said first flow path and said second flow path of said triple flow heat exchanger to recool said previously cooled and reheated fluid, said plant cooling water being passed through said third flow path in heat transfer relation with said first flow path and said second flow path to cool said fluid in said first flow path and said second flow path.

2. The means of claim 2 for cooling said blowdown fluid wherein said blowdown fluid initially enters said regenerative heat exchanger at a pressure $P_1$ and temperature $T_1$, passes through one of said primary flow path and said secondary flow path, and exits said regenerative heat exchanger at a pressure $P_2$ and temperature $T_2$, such that $P_2 < P_1$ and $T_2 < T_1$, and then passes through one of said first flow paths and said second flow path, exiting at a pressure $P_3$ and temperature $T_3$ such that $P_3 < P_2$ and $T_3 < T_2$, and then passes through the other of said primary flow path and said secondary flow path, exiting at a pressure $P_4$ and a temperature $T_4$, such that $P_4 < P_3$ and $T_4 > T_3$ and such that $T_4 < T_2$, and then passes through the other of said first flow path and said second flow path, exiting at a pressure $P_5$ and a temperature $T_5$, such that $P_5 < P_4$, $T_5 < T_4$, and $T_5$ is approximately equal to $T_3$.

3. The means of claim 1 for cooling said blowdown fluid wherein said regenerative heat exchanger is a U-tube and shell type heat exchanger.

4. The means of claim 1 for cooling said blowdown fluid wherein said first flow path and said second flow path comprise the interior of U-tubes, and said third flow path comprises the shell side of said triple flow heat exchanger.

5. The means of claim 1 for cooling said blowdown fluid wherein said triple flow heat exchanger comprises a first heat exchanger and a second heat exchanger, said first heat exchanger comprising one of said first flow path and said second flow path and further comprising a portion of said third flow path, and said second heat exchanger comprising the other of said first flow path and said second flow path and further comprising a portion of said third flow path.

* * * * *